United States Patent Office 2,910,498
Patented Oct. 27, 1959

2,910,498

N-(DIMETHYLTHIOCARBAMYL-MERCAPTO-METHYL)-CARBAMATE ESTERS

Walter C. Meuly, Mill Creek Hundred, Del., assignor to E. I. du Pont de Nemours and Company, Wilmington, Del., a corporation of Delaware No Drawing. Application April 18, 1958
Serial No. 729,250

3 Claims. (Cl. 260—455)

This invention deals with novel organic compounds which are useful as rodent repellents, and in related fields. The novel compounds of this invention may be designated broadly as N-dialkylthiocarbamyl-mercaptomethyl) derivatives of lower alkyl carbamates, and are expressible by the general formula

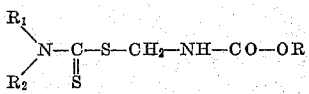

wherein $R_1$, $R_2$ and R are lower alkyl radicals, for instance methyl, ethyl, propyl (n or iso), or butyl (n, iso or tert.).

My novel compounds may be synthesized by methods analogous to those described in my copending application Serial No. 526,571 (Patent No. 2,842,583, issued July 8, 1958), that is by reacting one mole of a carbamate ester of the formula $NH_2$—CO—OR, wherein R has the same meaning as above, with 1 mole of a dialkyl-dithiocarbamic acid and 1 mole of formaldehyde, in an aqueous medium under conditions which discourage the tendency to form an intermediate methylene urethane compound. The latter conditions imply mixing the reactants in such a manner as to avoid contact between the formaldehyde and the urethane (carbamate ester) in the absence of other reagents for a prolonged length of time.

The reaction is preferably effected at a temperature not exceeding 60° C. At temperatures above 60° C., the process is still operative, but the yield is apt to go down.

The aqueous medium may consist of water alone or a mixture of water with one or more water-miscible solvents, for instance acetone.

The requisite dialkyl-dithiocarbamic acid is generally formed in situ either from its components, that is the corresponding dialkylamine and carbon disulfide or from its alkali-metal salt, for instance sodium dialkyl-dithiocarbamate, by feeding into the reaction mass controlled amounts of a relatively weak acid, such as acetic, tartaric, formic, citric or boric.

The order of mixing the reactants is generally immaterial, as long as the above noted caution concerning prolonged contact between the urethane and formaldehyde is observed.

Without limiting this invention, the following examples are given to illustrate my preferred mode of operation. Parts mentioned are by weight.

Example 1

45 parts of ethyl carbamate are dissolved in 56 parts of water. To this solution are added 23 parts of dimethylamine in the form of 57 parts of a 40% aqueous solution and 15.5 parts formaldehyde in the form of 42 parts of a 37% water solution. To this mixture are fed in slowly, under agitation, 39 parts of carbon disulfide at a temperature of 20° to 25° C. The solution becomes turbid and agitation is continued at room temperature for 16 hours. When cooled to 10° C., the oily product forms a mush of crystals, which are filtered after 3 hours and thoroughly washed with water. The mother liquor containing some oil deposits yields during the next 24 hours a further crop of crystals. The sandy crystals of the combined yields are almost colorless and melt at 59° to 60° C. Recrystallization from alcohol does not change the melting point. Elemental analysis of the product yields 12.7% nitrogen and 28.9% sulfur. These values are in close agreement with the formula below, which requires 12.6% nitrogen and 28.9% sulfur:

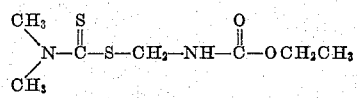

The product, therefore, constitutes ethyl N-(dimethyl-thiocarbamyl-mercaptomethyl)carbamate.

Example 2

When the ethyl carbamate in Example 1 is replaced by 59 parts of isobutyl carbamate, a reaction product is obtained which has a melting point of 78° to 79° C. and analyzes as 11.1% nitrogen and 26.0° sulfur. These values are in close agreement with the formula below, which requires 11.2% nitrogen and 25.8% sulfur:

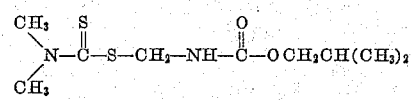

The product, therefore, constitutes isobutyl N-(dimethyl-thiocarbamyl-mercaptomethyl)carbamate.

The novel compounds of the above examples have been tested and found to be highly active as rodent repellents.

The details of the above examples may be varied within the skill of those engaged in this art. Thus, in lieu of dimethylamine in the examples above, any other lower dialkylamine may be employed, for instance diethylamine, methylethylamine, dipropylamine (n or iso), methylpropylamine, or the dibutylamines. In lieu of the specific carbamates named, others within the broad formula above may be employed, for instance methyl carbamate, propyl carbamate, isopropyl carbamate, n-butyl carbamate, sec-butyl carbamate, and tert-butyl carbamate.

I claim as my invention:

1. A compound of the formula

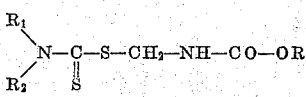

wherein $R_1$, $R_2$ and R are alkyl radicals of 1 to 4 C-atoms each.

2. Ethyl N-(dimethylthiocarbamyl-mercaptomethyl) carbamate.

3. Isobutyl N-(dimethylthiocarbamyl-mercaptomethyl) carbamate.

References Cited in the file of this patent

UNITED STATES PATENTS

| | | |
|---|---|---|
| 2,068,355 | Sibley | Jan. 19, 1937 |
| 2,842,583 | Meuly | July 8, 1958 |